(No Model.)
V. ARNOLD & J. CAWOOD.
Grain Meter.
No. 237,670.             Patented Feb. 15, 1881.
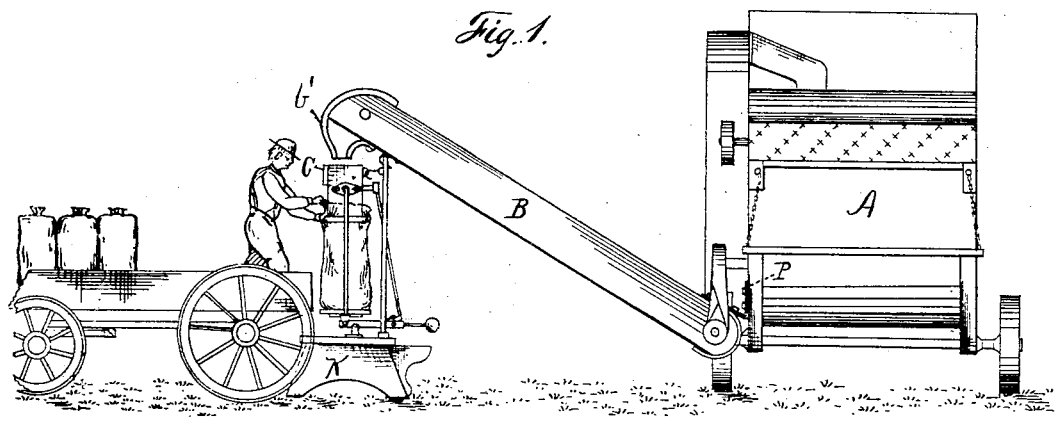
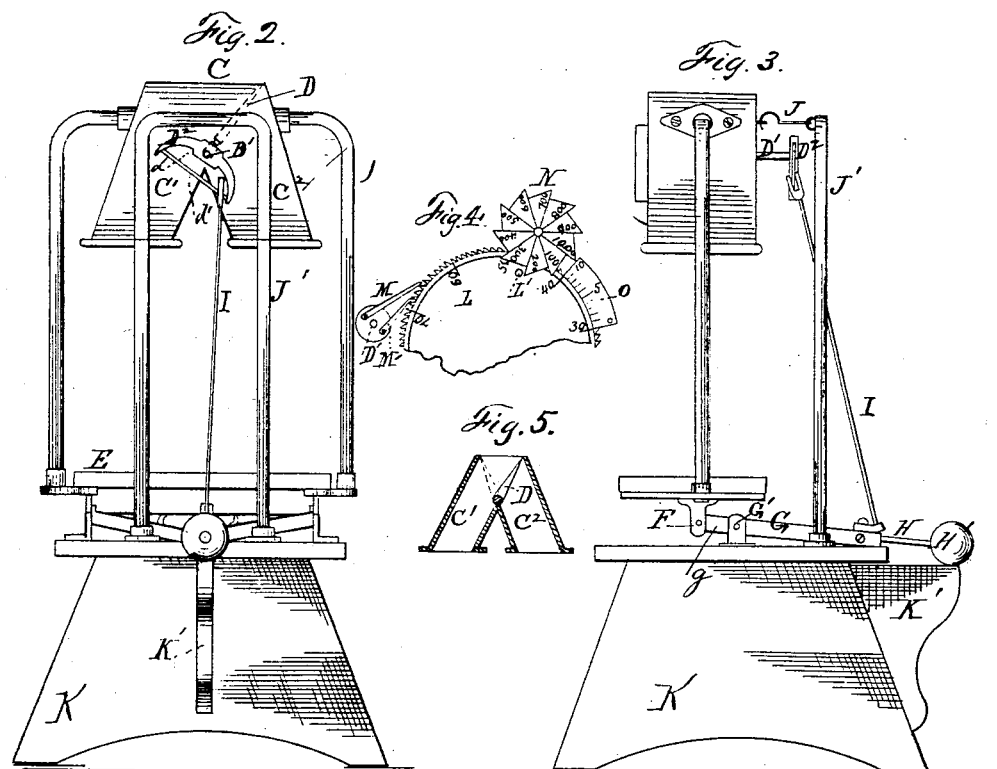
WITNESSES.                          INVENTOR.
Vindex Arnold
John Cawood
ATTORNEY.

UNITED STATES PATENT OFFICE.

VINDEX ARNOLD AND JOHN CAWOOD, OF MARSHALL, MICH., ASSIGNORS OF ONE-HALF TO M. V. WAGNER, OF SAME PLACE.

GRAIN-METER.

SPECIFICATION forming part of Letters Patent No. 237,670, dated February 15, 1881.

Application filed October 1, 1880. (No model.)

*To all whom it may concern:*

Be it known that we, VINDEX ARNOLD and JOHN CAWOOD, of Marshall, county of Calhoun, State of Michigan, have invented a new and useful Improvement in Elevating, Bagging, and Weighing Attachments for Grain-Separators; and we declare the following to be a full, clear, and exact description of the same, such as will enable others skilled in the art to which it pertains to make and use it, reference being had to the accompanying drawings, which form a part of this specification.

Our invention consists, first, in providing an attachment for a grain-separator consisting of an elevator for lifting the grain from the seed-trough and delivering it into a hopper, and, in connection therewith, a bag-filler and mechanism for weighing grain; secondly, in providing a grain-separator with an elevation extending out at right angles to the length of the separator, in connection with a bag-filler into which the elevator discharges, and mechanism for weighing the grain; thirdly, in the combination, with an elevator and bag-filling and weighing apparatus, of an indicator for registering the amount of grain weighed; fourthly, in providing, as an attachment for a thrashing-machine, a grain-elevator and bag-filler and weigher, the construction being such that the support upon which the bags rest shall be at or near the level of the wagon-bed, so that the bags, when filled, may be shifted directly into the wagon; also, in other novel features of construction.

In the drawings, Figure 1 is a front elevation of a thrashing-machine with our improvements connected and standing out at right angles at the side. Figs. 2 and 3 are views of the bag-filling and weighing mechanism; Fig. 4, a partial rear view, showing the registering mechanism with its face-plate removed. Fig. 5 represents a section, through the hopper, of the bag-filler, illustrating the interior wing-valve.

Heretofore, when operating with a separator, it has been customary to deliver the grain from the seed-trough beneath the machine out at one side of the machine into a seed-box, where it is measured, put into bags, and borne away by carriers. This has required usually a man to keep tally near the seed-box, another to measure and empty the grain into the bags, and several parties to bear off the grain. Moreover, the location is usually very dusty and inconvenient for the workmen, and in constantly handling the grain much is discharged upon the ground adjacent to the grain-box, and is either wasted, damaged, or filled with dust and dirt, so as to require recleaning.

It is the object of our invention to overcome these difficulties, to deliver the grain out at some distance to the side of the machine, dispense with parties usually employed for bearing off the grain, and obviate all questions as to the correctness of the amount of grain thrashed.

In carrying out our invention, A is a thrashing-machine of any ordinary description.

B is an elevator, which is so located as to receive the grain or seed as it is forced by the spiral conveyer out from the seed-trough beneath the machine. This elevator B may extend parallel with the side of the conveyer, but is preferably caused to extend outwardly therefrom at right angles to the length of the separator, in order that the grain or seed therefrom may be conveyed sufficiently far from the separator to be out of the way and free from the dust and chaff usually falling about the machine.

C is a hopper having two legs or channels, C' C², and an interior wing-valve, D, which directs the seed or grain into either leg of the hopper. This wing-valve is connected with a shaft, D', to which suitable mechanism is attached for shifting the valve when it is desired to change the direction of the grain into the other leg of the hopper. These legs are each provided with a flange or other appropriate device for holding the top of the bag, while the bottom of the bag rests upon a platform, E, beneath, the said hopper being supported from the said platform, as shown. The platform is, in turn, supported upon pivots F, located on the arms $g$ of a lever, G, which lever is pivoted at G'.

H is a sliding gage-bar, supporting a weight, H', which may be set so as to counterpoise any given weight of grain on the platform E.

A rod, I, connects the lever G with the shifting mechanism on the end of the valve-shaft D'. This shifting mechanism consists of a frame, D², having shoulders $d$ and a sliding rod, $d'$, which latter passes loosely through the upper end of the rod I.

The hopper is held in its proper position by means of a hook, J, attached to a suitable upright, J'.

The operation of the device will now be understood: The grain that has been separated, falling into the seed-trough at the bottom of the thrashing-machine, is, by its spiral conveyer, discharged into the elevator B. Being here caught by the buckets or slots $b$, the grain is carried to the top of the trough and discharged through the spout $b'$ into the hopper C. The wing-valve D then directs the grain into bags, the weight H' having been adjusted for any given weight of grain—say, two bushels. When that amount of grain has been discharged into the bag, its weight will cause the platform E and the hopper C to descend and the weight to rise. This movement, however, lifts on the rod I and causes the upper end of the rod to strike into the angle adjacent to one of the shoulders $d$ and instantly to shift the wing-valve D. The grain is at once directed into the other bag and the parts of the mechanism remain in this condition until the filled bag is removed from the platform, at which instant the weight H' descends and the upper part of the rod I slides down along the sliding rod $d'$ without shifting the wing-valve. A new bag is then adjusted in the place of the one removed, and when the other bag is filled with grain to the required weight the platform again descends, the rod J rises and again shifts the valve, so as to direct the grain into the empty bag, and so on. The foundation K is made preferably hollow, open on top, and with a floor within, so as to catch any grain that may accidentally be spilled from the spout or hopper above. This foundation is also preferably made so as to bring the platform E nearly on a level with the bottom of an ordinary wagon-bed, so that instead of employing persons to bear off the grain into a wagon, the filling and weighing apparatus may be so located that the driver can back his wagon right up to the device, and he alone can attend to fixing the empty bags upon the device, to removing the filled bags, tying them up, and dragging them back into his wagon.

Upon the hopper, in any convenient position, there may be an automatic register, which shall register the number of bags that have been filled. In the drawings we have represented this registering mechanism as connected to and actuated by the shaft of the wing-valve. In this mechanism L is a ratchet-wheel, and M and M' are two pawls located upon opposite sides of the shaft of the wing-valve, so that when the wing-valve moves in one direction the pawl M will engage with a ratchet and turn the wheel L through the arc corresponding with one notch, while the pawl M' will recede and drop behind a ratchet, so that when the wing-valve is again shifted the pawl M' will turn the wheel L through the arc corresponding with one ratchet. Each said movement of the wheel L will bring a new graduation into view, and will thus indicate just the number of bags that have been filled with grain. In the drawings, the wheel L is provided with one hundred graduations, and when the wheel has turned once around, a pin or projection, L', will engage with a ratchet on the wheel N and move that wheel one space. This latter wheel being divided into ten spaces will cause the device to register the bags up to one thousand bags. A stationary scale, O, is provided, adjacent to the wheel L, so that if the large wheel L is provided simply with the numbers 10, 20, 30, &c., this scale O will serve to show the exact number of the bags that have been filled.

The weight H' may, if desired, be made to slide upon a fixed rod, H, and we propose to provide a weight for—say, wheat and barley, and other weights for oats, clover, timothy, &c. In practice, these weights should be made of the same thickness, when measured vertically, so that they will, by coming down on the support K', always give the same range of motion to the hopper and platform, so as to always properly shift the wing-valve D. If the support K' be dispensed with entirely, and the lever G be permitted to strike a support, the shape or dimensions of the weight would be immaterial.

We would have it understood that in constructing this device we do not limit ourselves to a contrivance which shall stand out at right angles to the separator, nor to any particular form of elevator, or any particular form of weighing and bag-filling mechanism, for it is obvious these elements may be varied materially without departing from our invention. So, also, we do not limit ourselves to apparatus which shall stand at the level of a wagon-bed.

By this machine it will be seen that we dispense with much labor attendant upon the gathering, measuring, and handling of grain, and so dispense with the services of several parties, usually as many as five or six hands, ordinarily employed about the machine. Moreover, no questions can be raised as to the amount thrashed, as it is all weighed to a nicety, and an accurate and automatic register kept of the number of bags.

At the separator end of the elevator are suitable devices P, whereby it may be readily and quickly connected to or disconnected from the separator, and it is designed usually to provide with the apparatus suitable pulleys for making the connection from the driving mechanism of the separator to the elevator-pulley. Any suitable devices may be employed.

What we claim is—

1. The combination, with a grain-carrying trough and a valve alternately opening or closing the converging chutes, of the frame D², having a sliding rod and shoulders, the rod I, weighted lever H, and platform E, substantially as described.

2. In a grain-meter, the combination, with suitable automatic registering mechanism, a hopper, C, having a suitable valve, and a rocking frame, D², connected by a shaft to the valve and provided with a sliding rod, of the rod I, lever H, weight H′, and platform E, substantially as described.

In testimony whereof we sign this specification in the presence of two witnesses.

VINDEX ARNOLD.
JOHN CAWOOD.

Witnesses:
JAMES A. MINER,
C. D. BREWER.